United States Patent

[11] 3,627,457

[72] Inventor Georg Roder
Frankfurt am Main, Germany
[21] Appl. No. 801,695
[22] Filed Feb. 24, 1969
[45] Patented Dec. 14, 1971
[73] Assignee Messer Griesheim GmbH
Frankfurt am Main, Germany
[32] Priority Feb. 24, 1968
[33] Germany
[31] P 17 29 894.1

[54] PROCESS AND DEVICE FOR IGNITING OXYACETYLENE CUTTING TORCHES
11 Claims, 6 Drawing Figs.

[52] U.S. Cl. ................................................. 431/6, 431/263, 266/23 P
[51] Int. Cl. ..................................................... F23q 9/08
[50] Field of Search........................................... 431/6, 191, 258, 254, 263; 266/23 P

[56] References Cited
UNITED STATES PATENTS

| | | | |
|---|---|---|---|
| 1,556,880 | 10/1925 | Royer............................ | 431/263 |
| 2,492,756 | 12/1949 | McCollum...................... | 431/6 X |
| 3,052,112 | 9/1962 | Wheeler......................... | 431/191 X |
| 3,168,133 | 2/1965 | Zoschak......................... | 431/263 |
| 3,255,803 | 6/1966 | Hach, Jr. et al................ | 431/263 |
| 3,304,988 | 2/1967 | Rackley......................... | 431/263 |
| 3,486,498 | 12/1969 | Taschler........................ | 431/263 X |

Primary Examiner—Frederick L. Matteson
Assistant Examiner—Robert A. Dua
Attorney—Connolly and Hutz ABSTRACT: A process and device for igniting autogenous cutting torches, particularly in multitorch cutting machines, includes conducting the fuel gas mixture into the cutting oxygen canal or into an auxiliary canal connected with the cutting oxygen canal where the ignition takes place. A portion of the heating oxygen is utilized to produce a suction effect within the cutting oxygen canal.

PROCESS AND DEVICE FOR IGNITING OXYACETYLENE CUTTING TORCHES

BACKGROUND OF THE INVENTION

This invention relates to a process and device for igniting oxyacetylene cutting torches, particularly with respect to multitorch cutting machines.

An igniting device for autogenous cutting torches is known where a so-called pilot flame is arranged at the torch or in its proximity so that the flame cone of this pilot flame is situated somewhat below the cutting nozzle. Once fuel gas emerges from the nozzle, it is automatically ignited by the pilot flame. The ignition of the pilot flame is done by hand as a nonrepetitive step. From then on the pilot flame continues to burn.

The disadvantages of this known device consist essentially in that an additional, separate gas supply line for the pilot flame must be provided. Furthermore, an unnecessary gas consumption occurs. In addition, this igniting device also imposes a considerable limitation of the freedom of movement at the torch. Even the ignition of the pilot flame by hand to put the cutting torch into operation represents a cumbersome and time-consuming process, particularly when the machine has numerous torch aggregates, each of which requires its own pilot flame.

A further known device avoids the lastly named disadvantage by the ignition of the pilot flame by means of an electric spark gap. Such an electric igniting device, however, is very expensive and sensitive, so that the freedom of movement at the torch is thereby further limited.

According to a further known ignition device, ignition of the heating gases emitted from the nozzle occurs by means of an electric spark gap. Here an ignition electrode must be brought to a certain distance to the cutting nozzle. The other electrode then forms the torch itself. The necessary voltage is supplied by a motor-driven magnetic coil or an ignition coil. Even this known device is naturally very expensive and non-wear-resistant, especially because of the high heat influences in the cutting process, and limits to a great extent the mobility of the torches.

SUMMARY OF THE INVENTION

The object of this invention is to avoid the above disadvantages, i.e. to develop an ignition process and device which operate economically, with decreased non-wear-resistance, and also more reliably. For the solution of this problem, the fuel gas mixture is conducted into the cutting oxygen canal of the torch and is ignited there or is conducted into an auxiliary canal connected with the cutting oxygen canal.

The flame, burning back up to the nozzle outlet, can then, without difficulty, ignite the heating gas mixture emitted from the heating gas boring. A considerable advantage of the invention is that no special heating gas supply need be provided. Furthermore, a part of the heating gas mixture which is suitably present anyway is branched off and employed for the intended ignition process. Since the ignition process takes place in the interior of the torch, no additional aggregates surrounding the torch outlet are necessary, and the freedom of movement of the torch is not impaired in any way.

The introduction of the heating gas mixture into the cutting oxygen canal can take place in an advantageous further development of the invention in that a part of the unignited heating gas mixture emitted from the heating gas borings of the torch is drawn into the cutting oxygen boring for the purpose of ignition.

According to the invention, it is preferred in this connection that part of the heating oxygen serve for producing the suction effect within the cutting oxygen boring. This eliminates a special device for producing the suction pressure, which device basically would be possible.

A device for carrying out the process described above is characterized by a separate injection nozzle, acted upon by the heating oxygen, whose suction pipe is connected with the cutting oxygen canal.

The required ignition temperature is suitably produced by electrical means. Basically it is possible to produce an electric spark gap within the cutting oxygen canal. According to the invention, however, an ignition device is preferred which is characterized by an electrical igniter for the ignition of the heating gas mixture. Such an igniter has the advantage of operating with a nondangerous low voltage and its construction is uncomplicated and therefore economical.

The electric igniter is suitably arranged in the suction pipe of the injector nozzle branched off from the cutting oxygen conduit.

For the construction of the igniter, it is preferred that the igniter consist of an ignition wire arranged in a casing, the wire being inserted into the suction conduit laterally from outside.

The casing can, for example, be provided with a winding and with suction pipe can be screwed in. In this manner a simple exchange of the igniter is possible, similarly to a cartridge.

In order to avoid too far a flash back of the flame, it is recommended to arrange a flame barrier between the injector nozzle and the igniter.

Putting the torch into operation suitably proceeds as follows: First the heating gas flow is switched on simultaneously with the electrical current for the igniter. When the igniter is passed through by the current, the suction pipe as well as the heating oxygen supply line to the injector nozzle are released. Then the above-described ignition process can take place. With the opening of the cutting oxygen valve there occurs a closing off of the suction pipe and of the injector nozzle, since now no heating gas mixture is desired in the cutting oxygen boring.

For the control of the injector nozzle according to the above pattern, an electromagnetic valve is preferable which serves both for the control of the heating oxygen current acting upon the injection nozzle as well as for the control of the heating gas mixture flowing into the suction pipe.

The electromagnetic valve is controlled in such a manner that it opens when current flows through the ignition wire, and, conversely, it closes when this flow of current is interrupted.

This advantageously avoids a drawing in of heating gas mixture into the cutting oxygen boring when the igniter is out of operation.

The above-described novel steps all refer to the above-described basic principle of drawing in part of the heating gas mixture through the cutting oxygen canal for the purpose of ignition. In another type model, it is proposed by the invention that within the torch a part of the heating gas mixture be forced into the cutting oxygen canal.

This type model has the advantage that a special injection nozzle as well as corresponding branching off canals are thus eliminated. Even the above-named, twice-acting electromagnetic valve can then be eliminated.

A device for carrying out the lastly named process is characterized by a one-way valve in a connecting pipe between heating gas canal and cutting oxygen canal, which is closable by means of the cutting oxygen pressure.

With opened heating gas valves and closed cutting oxygen valve, the one-way valve is opened by heating gas pressure, and a part of the heating gas mixture reaches into the cutting oxygen boring, where it is ignited. The flame emitted from the cutting oxygen boring then ignites the rest of the heating gas mixture. With switching on the cutting oxygen, by its pressure, the one-way valve is closed automatically, so that during the cutting process no heating gas mixture can reach into the cutting oxygen boring.

It is suitable to arrange in the connecting pipe a flame barrier between heating gas and cutting oxygen canals.

For the igniting of the heating gas mixture, an igniter serves again suitably, which in this case, however, is arranged in the cutting oxygen canal directly behind the one-way valve as seen in the direction of the current.

According to the first-named type model, here it is also advantageous for the igniter to consist of a resistance wire arranged in a casing, the casing being inserted into the cutting oxygen canal laterally from outside.

On the basis of safety, — in order to prevent flame backfires into the cutting oxygen supply line — in both novel model types are arranged, in a manner known per se, a one-way valve in the cutting oxygen canal — at the torch connection.

For the quick and heating-gas-saving adjustment of an ignitable heating gas mixture, it is recommended to provide the dosaging valves for heating oxygen and fuel gas with markings at the activation buttons which are adjusted to the nozzle size of the torch.

Such a coordination of the markings on both dosaging valves is suitable that in the correlation of two markings, the optimum mixture ratio for the heating gas mixture is adjusted for one particular nozzle size.

THE DRAWINGS

DETAILED DESCRIPTION

Figure 1:
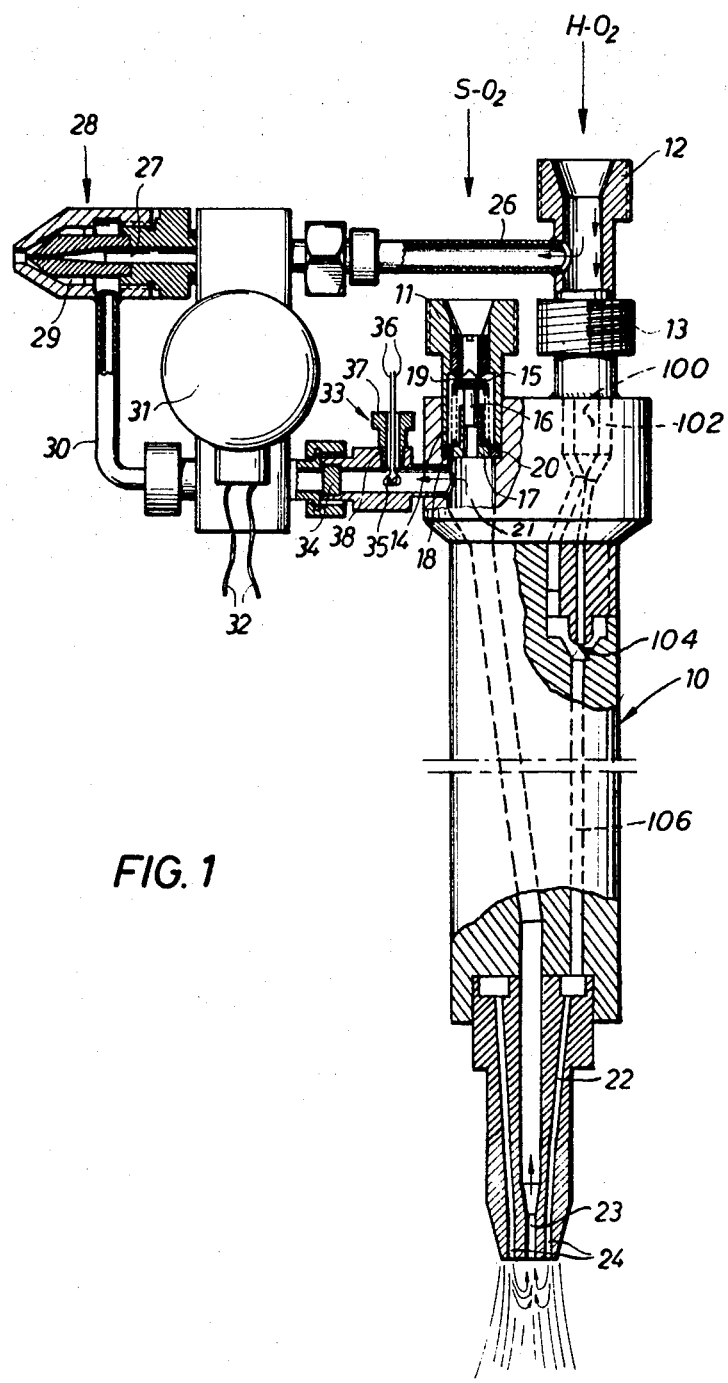
FIG. 1 shows an autogenous cutting torch in partial cross section, in accordance with this invention.

According to FIG. 1, an autogenous or oxyacetylene cutting torch, for example consisting of a multitorch aggregate of a cutting machine 10 having a connection 11 for cutting oxygen as well as a connection 12 for heating oxygen and a connection 13 for fuel gas. Heating oxygen and fuel gas come together within the torch to form a heating gas mixture in any suitable manner as schematically illustrated by conduits 100 and 102 leading to mixing means 104 with the mixture flowing through passage 106 into the borings 24. In connection 11 for the cutting oxygen there is arranged a one-way valve 14. A valve disk 15 is driven into a casing 17 by means of a rod or piston 16 and there is pressed on the valve seat 19 by a pressure spring 18. The valve disk or piston head 15 is lifted from valve seat 19 by the cutting oxygen pressure against the resistance of spring 18, and oxygen can flow through openings 20 into the cutting oxygen canal 21 in the torch.

The torch nozzle 22 contains a central cutting oxygen boring 23. Concentrically around the cutting oxygen boring 23 are arranged borings 24 for the heating gas mixture.

Directly behind connection 12 for the heating oxygen a pipe 26 is branched off through which a part of the heating oxygen is conducted to a boring 27 in an injector nozzle 28. The suction produced by the heating oxygen in the injector nozzle 28 acts on the cutting oxygen canal 21 by way of a suction pipe or auxiliary canal 30 connected with the annular canal 29 of the injector nozzle. Suction pipe 30 connects into the cutting oxygen canal 21 directly behind the one-way valve 14. Conduit 26 as well as suction pipe 30 are controlled by an electromagnetic valve 31 whose current terminals are designated with 32. Between cutting oxygen canal 21 and electromagnetic valve 31 there is arranged in the suction pipe 30 an igniter 33 as well as a flame barrier 34. Igniter 33 consists of a resistance wire 35 with current terminals 36 which is arranged in a casing 37 similar to a cartridge. Casing 37 provided with winding 38 is screwed in laterally into the suction pipe 30.

The ignition process of the torch proceeds as follows: After opening the dosaging valves for the heating oxygen and fuel gas, illustrated in FIGS. 4–6 and described in more detail below, the current for the igniter 33 can be turned on. Igniter 33 and magnetic valve 31 are coupled in such a manner that the latter opens with current-traversed igniter, and, conversely, closes when the igniter is switched off. With the opening of the magnetic valve 31, heating oxygen reaches into injector nozzle 28 by way of conduit 26. There a suction is produced acting upon cutting oxygen canal 21 by way of suction pipe 30. A part of the heating gas mixture emitted from openings 24 of the torch nozzle 22 passes as a result of this suction into the cutting oxygen boring and from there into suction pipe 30 by way of cutting oxygen canal 21 where ignition occurs by means of igniter 33. The ignited heating gas mixture burns back in the cutting oxygen canal 21 up to the outlet at the torch nozzle 22 and ignites there the heating gas mixture emitted from openings 24. Subsequently the nonillustrated valve can be opened for the cutting oxygen, the magnetic valve 31 being closed simultaneously, since now no suction is required in the suction pipe 30. The igniter can now be switched off. This switching off of the igniter and magnetic valve 31 must take place directly after the igniting of the fuel-gas-oxygen mixture in order to avoid the heating up of the conduit system. (The injector nozzle 28 would otherwise draw in hot combustion gases.) It is suitable to let the ignition and switching off process occur automatically by means of a device adjusted to about 2 seconds.

Figure 2:
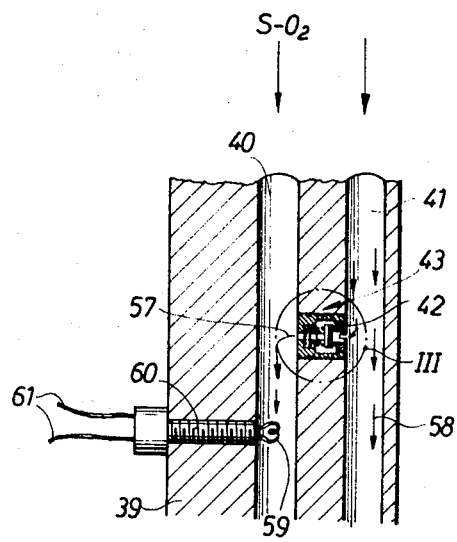
FIG. 2 shows a view in cross section of a portion of another specific embodiment of an autogenous cutting torch.
Figure 3:
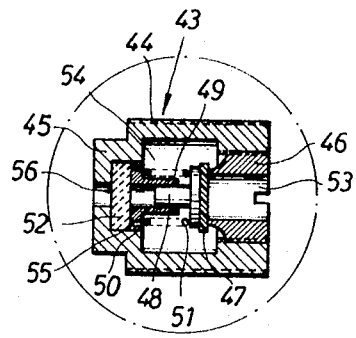
FIG. 3 shows the unit III of FIG. 2, enlarged.

In the type model of FIGS. 2 and 3, the heating gas mixture to be ignited is not drawn into the cutting oxygen canal, but instead is pressed in. The torch part illustrated in FIG. 2 is designated with 39, the cutting oxygen canal with 40 and the heating canal with 41. Between heating gas canal 41 and cutting oxygen canal 40 there is a connecting pipe 42 where a one-way valve 43 is arranged. The one-way valve, illustrated in greater detail in FIG. 3, consists of a housing 45 provided with a winding or threads 44 wherein a valve seat 46 is screwed in place. A valve disk 47 is attached to a shaft or piston rod 48 which is conducted or reciprocates in a casing 49. Between a collar 50 of casing 49 and the valve disk 47, a pressure spring 51 is supported which presses the valve disk 47 on the valve seat 46. A flame barrier 52 consisting of a porous, nonflammable material is also arranged in housing 45.

After opening of the dosaging valves for the fuel gas and heating oxygen, illustrated in FIGS. 4–6 and later explained in more detail, in a nonillustrated manner in the torch there is formed from these two gases a heating gas mixture which arrive in the heating gas canal 41. By the pressure of this heating gas mixture, valve disk 47 is lifted from the valve seat 46 against the resistance of pressure spring 51, and a part of the heating gas passes through the boring 53 into the housing chamber 54. From there the heating gas goes over through borings 55 in the collar 50 of casing 49 as well as through the borings of the flame barrier 52 through a boring 56 in housing 45 into the cutting oxygen canal 40. In the cutting oxygen canal 40 the heating gas then flows further in the direction to the nonillustrated nozzle outlet. The current direction of the heating gas mixture is shown in FIG. 2 by arrows 57 or 58. In the cutting canal 40 occurs the ignition of the heating gas located there by means of a red-hot resistance wire 59 protruding into the cutting oxygen canal. The resistance wire serving as igniter is arranged, similarly to the already above-described type model of FIG. 1, in a casing 60, which is laterally screwed in place in torch 39. The current terminals of the igniter are designated at 61.

The heating gas mixture ignited in the cutting oxygen canal 40 now burns on up to the nozzle outlet, and ignites there the rest of the heating gas mixture emitted from the heating gas canal 41. Subsequently the cutting oxygen can be turned on and igniter 59 can be turned off. By means of the relatively high cutting oxygen pressure, one-way valve 43 is closed, so that during the cutting process no heating gas can any longer reach into the cutting oxygen canal 40.

Figure 4:
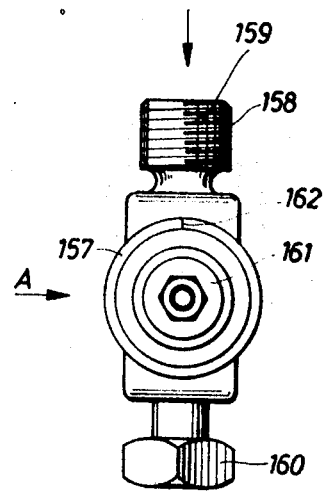
FIG. 4 shows a view of a heating gas dosaging valve.
Figure 5:
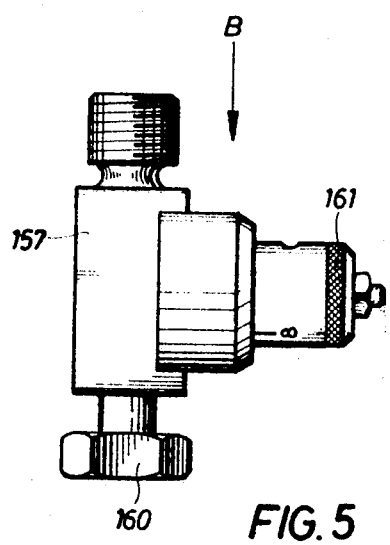
FIG. 5 shows a view in the direction of arrow A in FIG. 4.
Figure 6:
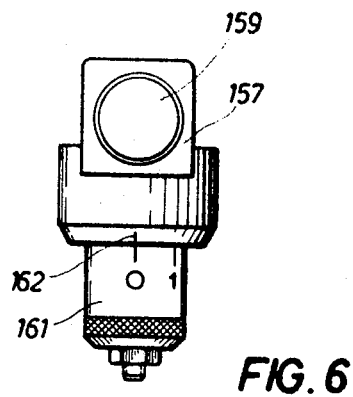
FIG. 6 shows a view in the direction of arrow B in FIG. 5.

The terminal provided with winding 58 at the corresponding conduit is designated with 59 with respect to the dosaging valve 157, shown in FIGS. 4–6, for heating oxygen or fuel gas (the dosaging valves for heating oxygen and fuel gas can basically be constructed similarly). For mounting valve 157 there is provided a hexagon-shaped capscrew 60. Laterally at the valve body there is arranged the turnable activating button 161 for the valve. The control button 161 is provided with markings at its peripheral area, which according to the embodiment of FIGS. 4-6 go from zero to eight and which are adjusted to the current sizes of torch nozzles. A fixed point 162 at the valve body serves for controlling the particular set values. The optimum heating gas mixture for a certain torch nozzle is set in correlation of corresponding markings at both dosaging valves.

Because of the markings, a tedious searching of the optimum flame adjustment is eliminated for the operator.

What is claimed is:

1. In a process for the ignition of autogenous cutting torches the improvement comprising conducting the fuel gas mixture into the cutting oxygen canal of the torch where the ignition takes place, a portion of unignited fuel gas mixture emitted from the torch being drawn back into the torch into the cutting oxygen canal and utilized for ignition, and a portion of the heating oxygen being utilized to produce a suction effect within the cutting oxygen canal.

2. A device for the ignition of autogenous cutting torches comprising at least one cutting torch, a cutting oxygen canal in said torch and terminating at the end of said torch, means for feeding cutting oxygen to said canal, a fuel gas passageway, means for feeding fuel gas to said passageway, a heating oxygen passage, means for feeding heating oxygen to said passage, mixing means connected to said passage and said passageway to mix the fuel gas and heating oxygen to create a fuel gas mixture therefrom, a fuel gas mixture boring connected to said mixing means and terminating at said end of said torch adjacent said cutting oxygen canal, a separate injection nozzle communicating with said heating oxygen passage for actuation by the heating oxygen, and suction means connecting said injection nozzle with said cutting oxygen canal whereby fuel gas mixture will be drawn into said cutting oxygen canal.

3. A device as set forth in claim 2 wherein an electric igniter for igniting the fuel gas mixture is disposed between said injection nozzle and said cutting oxygen canal.

4. A device as set forth in claim 3 wherein said suction means includes a suction pipe branched off from said cutting oxygen canal and communicating with said injection nozzle, and said igniter being disposed in said suction pipe.

5. A device as set forth in claim 4 wherein said igniter includes a casing, a resistance wire being in said casing and extending from externally of said torch and being inserted into said suction pipe.

6. A device as set forth in claim 3 wherein a flame barrier is disposed between said injection nozzle and said igniter.

7. A device as set forth in claim 5 including electromagnetic valve means controlling the heating oxygen stream acting upon said injection nozzle and controlling the gas mixture passing through said suction pipe.

8. A device as set forth in claim 7 wherein said electromagnetic valve means opens upon flow of current through said resistance wire and closes upon interruption of current through said resistance wire.

9. A device as set forth in claim 2 wherein a one-way valve is disposed in said cutting oxygen canal adjacent said cutting oxygen feed means.

10. A device as set forth in claim 2 wherein dosing valves are provided for the supply of heating oxygen and fuel gas, each of said dosing valves having an activation button with markings calibrated from zero to eight for facilitating flow adjustment in accordance with the torch nozzle size.

11. A device as set forth in claim 10 wherein the markings on each of said dosing valves are coordinated whereby the setting of both valves results in a correlation for effecting an optimum mixture ratio of fuel gas to heating oxygen.

* * * * *